UNITED STATES PATENT OFFICE.

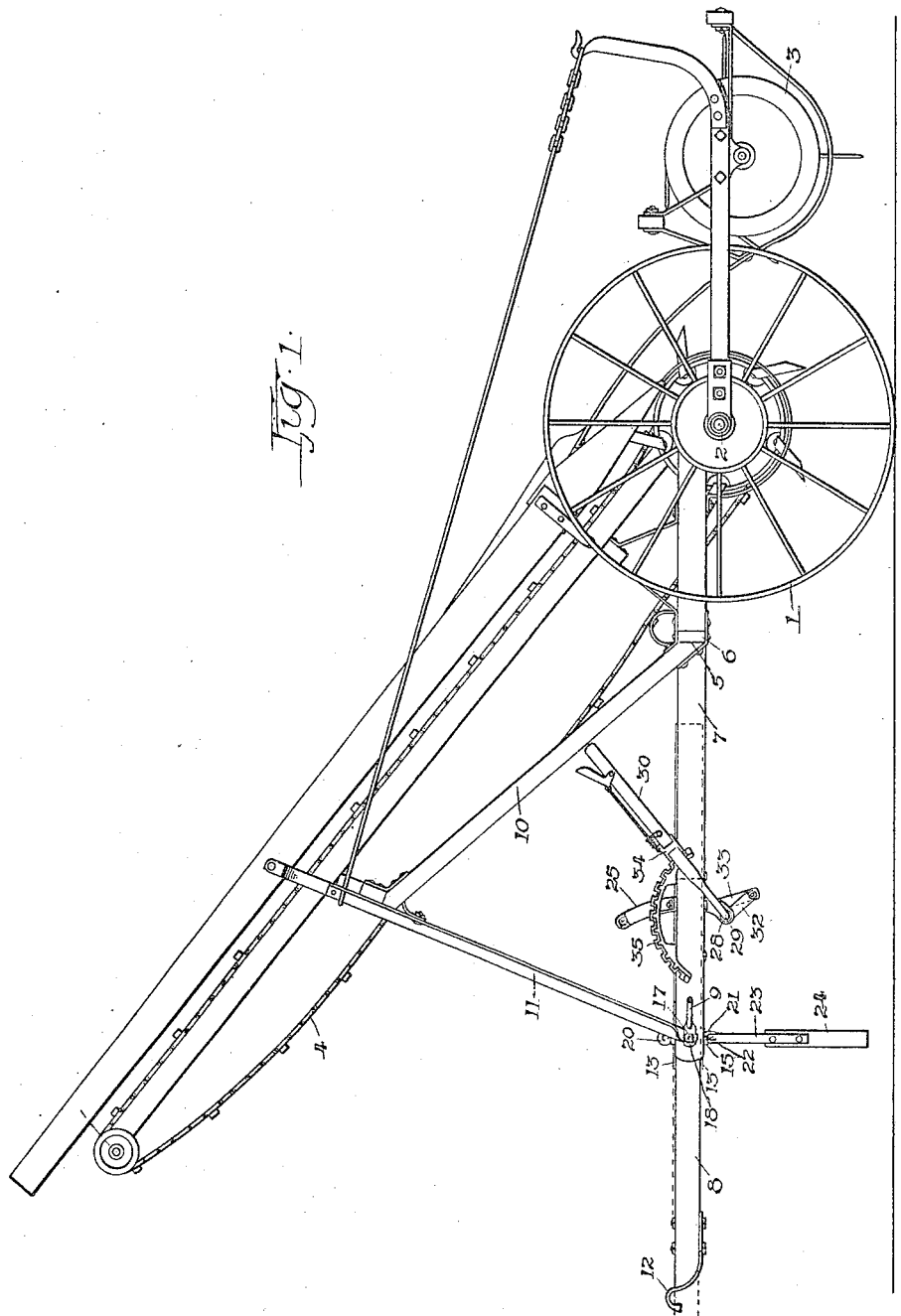

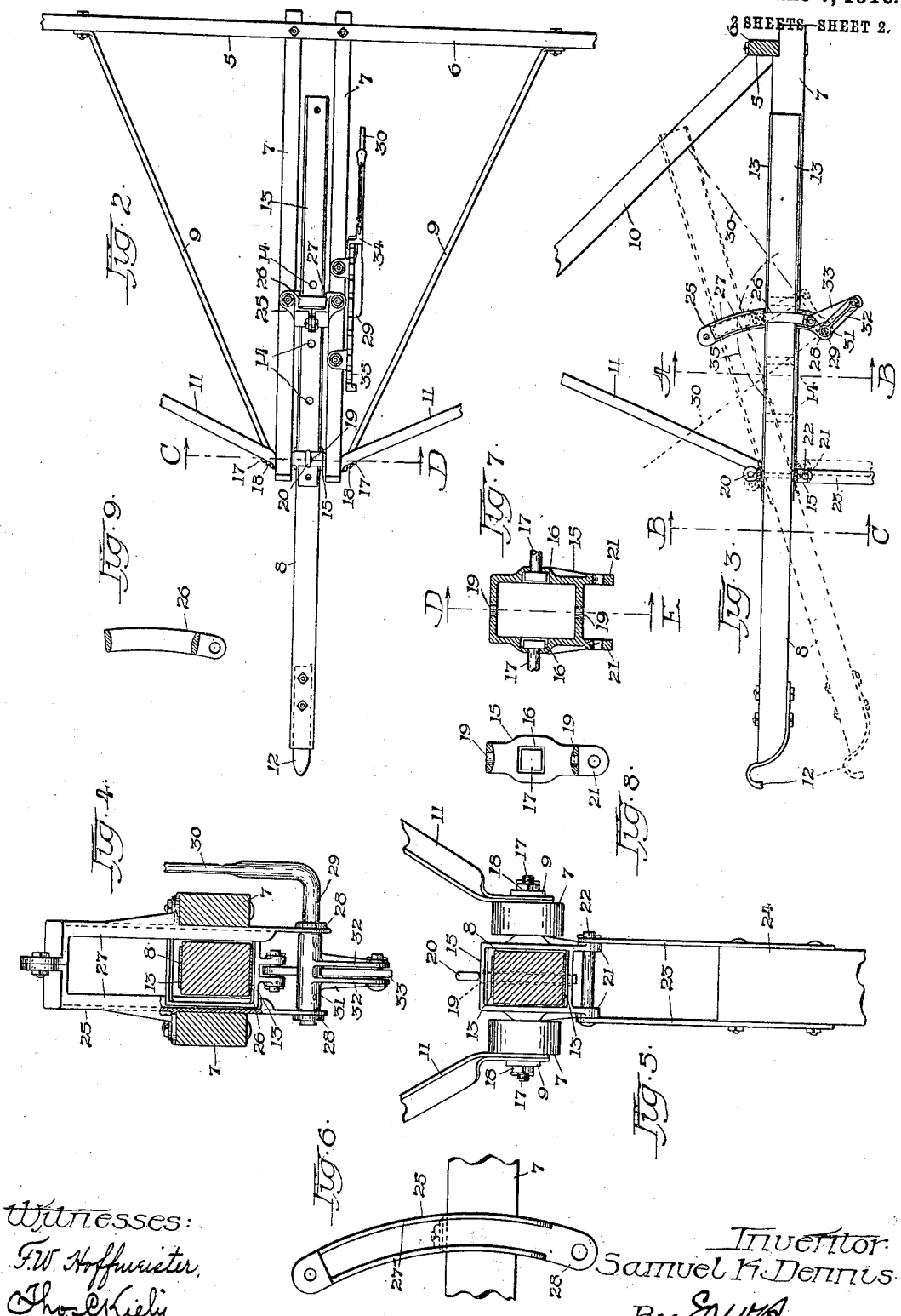

SAMUEL K. DENNIS, OF CHICAGO, ILLINOIS, ASSIGNOR TO INTERNATIONAL HARVESTER COMPANY, A CORPORATION OF NEW JERSEY.

HAY-LOADER.

960,845.  Specification of Letters Patent. Patented June 7, 1910.

Application filed January 27, 1910. Serial No. 540,376.

*To all whom it may concern:*

Be it known that I, SAMUEL K. DENNIS, a citizen of the United States, residing at Chicago, in the county of Cook and State of Illinois, have invented certain new and useful Improvements in Hay-Loaders, of which the following is a specification.

My invention relates to hay loaders, and in particular to the construction of the draft devices whereby the loader is connected with a wagon; its object being to provide a mechanism that may be conveniently manipulated in a manner to vary the height of the tongue connection and its operative length. These objects are attained by means of the mechanism illustrated in the accompanying drawings, in which—

Figure 1 is a side elevation of a hay loader embodying my invention; Fig. 2 is a top view of the draft devices; Fig. 3 is a side elevation, partly in section, of Fig. 2; Fig. 4 is an enlarged cross section on line A—B of Fig. 3; Fig. 5 is an enlarged cross section along line B—C of Fig. 3; Fig. 6 is a side elevation of part of the tongue adjusting mechanism; Fig. 7 is a vertical section of part of the tongue adjusting mechanism along line C—D of Fig. 2; Fig. 8 is a vertical section of Fig. 7 along line D—E; Fig. 9 is a vertical section of one of the tongue controlling members.

The same reference characters designate like parts throughout the several views.

1 represents carrying wheels mounted upon an axle 2 having a raking cylinder 3 in rear thereof and adapted to swing about the axis of the axle, and 4 represents an elevator designed to convey the hay upward toward a wagon to which the loader may be attached.

5 represents a draft frame including a transverse bar 6, and secured to the elevator frame members are longitudinally arranged fixed tongue members 7 spaced apart and adapted to loosely receive a tongue member 8 between them, brace members 9, having their rear ends secured to opposite ends of said transverse bar and their forward ends to the front ends of the fixed tongue members; brace members 10 having their lower ends secured to the transverse bar and inclining upward are secured at their upper ends to the elevator frame and brace members 11, having their lower ends secured to the front ends of the fixed tongue members and their upper ends to the side members of the elevator frame.

Secured to the front end of the loose tongue member is a hook 12, whereby it may be attached to a wagon, and 13 represents plates secured to the upper and lower sides of the loose tongue member and having a series of holes 14 therein that extend through the tongue.

15 represents a yoke received between the forward ends of the fixed tongue members and adapted to receive the loose tongue member in a slidable manner, the yoke having lateral openings 16 in its side walls that are adapted to receive bolts 17 that extend through openings in the fixed tongue members and receive at their outer ends the brace members 9 and 11 and nuts 18, the bolts being free to turn with the yoke. The yoke is provided with vertical openings 19 adapted to receive a pin 20 that may pass through any of the openings in the loose tongue for the purpose of varying the effective length relative to the fixed tongue members, and 21 represents depending ears upon opposite sides thereof at its lower end, having transverse openings therein adapted to receive a pin 22 that connects them with the upper ends of the bars 23 forming part of a swinging leg 24 adapted to sustain the weight of the forward end of the loader, as is common in this class of machines.

25 represents a stirrup having the form of a segment concentric with the axis of the yoke 15 and secured to the fixed tongue member and adapted to receive between its opposite side members the loose tongue member.

26 represents a yoke surrounding the loose tongue and having side walls curved in a manner to be received between the guide ribs 27 upon the inner sides of the walls of the stirrup in a slidable manner.

28 represents depending ears forming parts of the stirrup, in which is journaled the lower transversely bent end 29 of a lever having a vertically arranged hand portion 30. Secured to the bent portion of the lever, between the ears 28, is a sleeve 31, having arms 32 that have their outer ends pivotally connected with the lower end of the yoke 26 by means of a link 33. The lever is provided with a common form of sliding detent 34 that engages with an enlarged sector 35 in a manner to secure it in any desired position of adjustment.

In operating the mechanism the loader is supported by means of the leg 24. The loose tongue may then be connected with the wagon, the pin 20 being inserted in one of the series of openings therein for the purpose of properly adjusting the length of the draft connection to meet the requirements of the position of the wagon relative to the loader, and the hand lever 30 may then be manipulated in a manner to adjust the height of the delivery end of the elevator from the wagon.

What I claim as being my invention, and desire to secure by Letters Patent, is:

1. A draft connection for hay loaders including, in combination, fixed tongue members, a loose tongue member adjustable longitudinally relative to said fixed members and having a transverse pivotal connection with said fixed members, and lever mechanism operatively connecting said tongue members in a manner whereby said loose member may be rocked and secured in any desired position relative to said fixed members.

2. A draft connection for hay loaders including, in combination, fixed tongue members, a loose tongue member adjustable longitudinally relative to said fixed members and having a transverse pivotal connection with said fixed members, and a lever mechanism mounted upon the fixed members and operatively connected with said loose member whereby the latter may be rocked about its pivotal connection and secured in any desired position of adjustment.

3. A draft connection for hay loaders including, in combination, fixed tongue members having an intervening space between them, a loose tongue member received by said space and adapted to be adjusted longitudinally thereof and having a pivotal connection with the forward ends of said fixed tongue members, and a lever mechanism pivotally connecting the rear end of said loose tongue member with said fixed members in a manner whereby said loose member may be rocked about its pivotal connection and secured in any desired position of adjustment.

4. A draft connection for hay loaders including, in combination, fixed tongue members having an intervening space between them, a yoke having a transverse pivotal connection with the forward ends of said fixed tongue members, and vertical openings in the upper and lower walls thereof, a loose tongue member received by said yoke and extending rearward in said intervening space, a series of vertical openings in said loose tongue member, a pin operatively connecting said member with said yoke in a manner to vary the effective length of said loose tongue member, and a lever mechanism operatively connecting the rear end of said loose tongue member with said fixed members in a manner whereby the former may be rocked about its pivotal connection and secured in any desired position of adjustment.

5. A draft connection for hay loaders including, in combination, fixed tongue members, a loose tongue member adjustable longitudinally relative to said fixed members, said loose tongue member being pivotally connected with the forward ends of said fixed members, a stirrup secured to said fixed members in rear of said pivotal connection, a yoke slidably received by said stirrup and receiving the rear end of said loose tongue member, a hand lever mechanism mounted upon said fixed members and connected with said yoke in a manner whereby the loose member may be rocked about its pivotal connection with the fixed tongue members, and secured in any desired position of adjustment.

6. A draft connection for hay loaders including, in combination, fixed tongue members, a loose tongue member adjustable longitudinally relative to said fixed members, a yoke having a transverse pivotal connection with the forward ends of said fixed tongue members, said loose tongue member being received by said yoke and extending in front and rear thereof, a stirrup secured to said fixed members in rear of said yoke, a yoke slidably received by said stirrup, the rear end of said loose tongue member being received by said yoke, a hand lever mounted upon said fixed tongue member, a link connection between said hand lever and said yoke whereby the loose tongue member may be rocked about its pivotal connection, and means for securing the lever in any desired position of adjustment.

7. A draft connection for hay loaders including, in combination, fixed tongue members, a supplemental tongue member having a pivotal connection with the forward ends of said fixed members and extending rearward therefrom, a stirrup secured to said fixed members, a yoke slidably received by said stirrup and receiving the rear end of said pivoted member, a hand lever mounted upon said fixed tongue members, a link connection between said hand lever and said yoke whereby the pivoted member may be rocked in a vertical plane, and means for securing the hand lever in any desired position of adjustment.

SAMUEL K. DENNIS.

Witnesses:
EVAN EVANS,
HERBERT DEKKER.